June 16, 1925. 1,541,919
E. R. BRIGGS
SEED AND FERTILIZER SCATTERER
Filed March 31, 1924
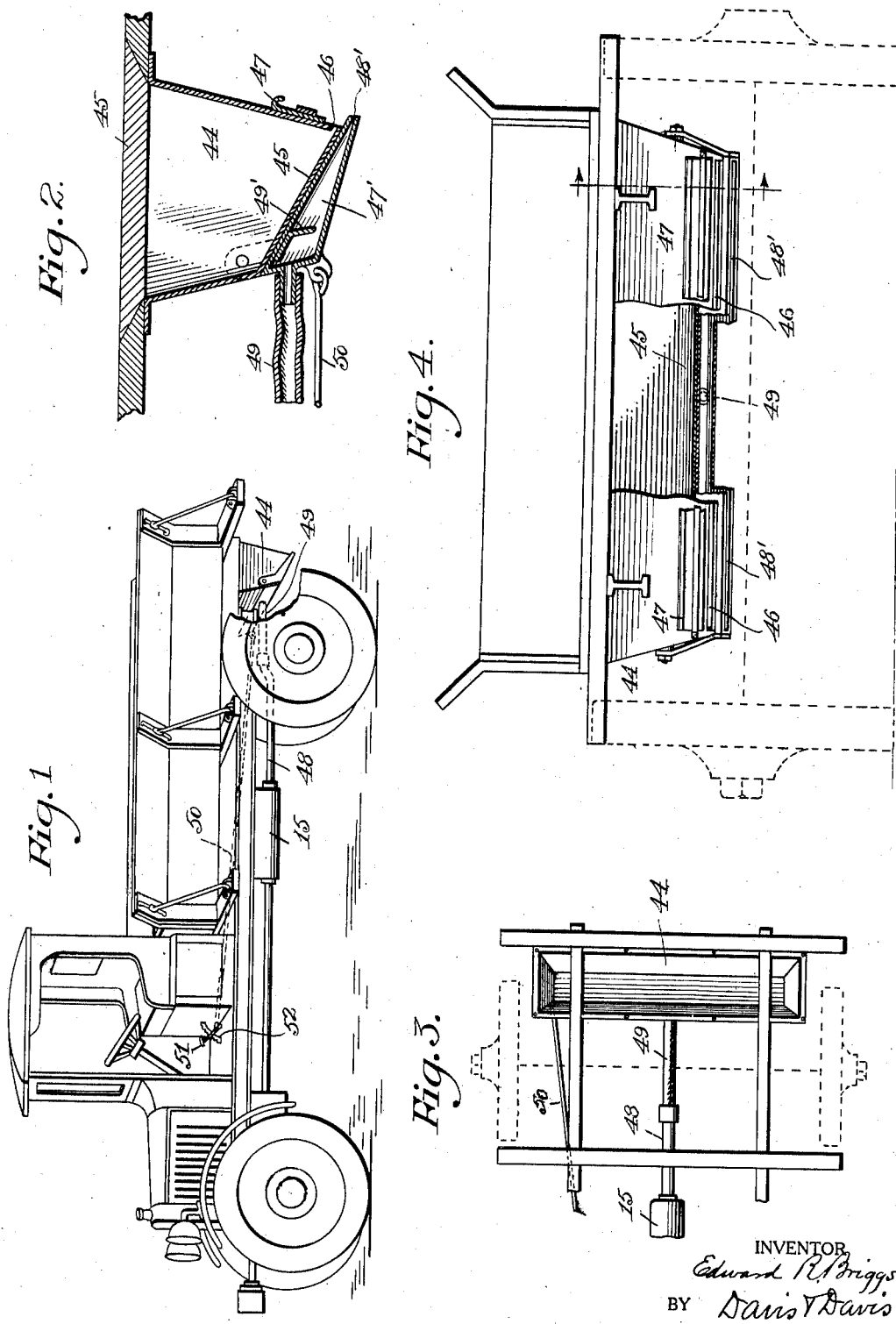
INVENTOR
Edward R. Briggs
BY Davis & Davis
ATTORNEYS

Patented June 16, 1925.

1,541,919

UNITED STATES PATENT OFFICE.

EDWARD R. BRIGGS, OF BERKELEY, CALIFORNIA.

SEED AND FERTILIZER SCATTERER.

Application filed March 31, 1924. Serial No. 703,161.

*To all whom it may concern:*

Be it known that I, EDWARD R. BRIGGS, a citizen of the United States of America, and a resident of Berkeley, county of Alameda, and State of California, have invented certain new and useful Improvements in Seed and Fertilizer Scatterers, of which the following is a full and clear specification.

The object of this invention is to provide means whereby the exhaust from the motor for driving the vehicle may be utilized to scatter seed or fertilizer, as more fully hereinafter set forth.

In the drawing—

Fig. 1 is a side elevation of a motor-driven vehicle equipped with my invention;

Fig. 2 is a vertical transverse sectional view of the hopper;

Fig. 3 is a plan view of a portion of the vehicle;

Fig. 4 is a rear view of the hopper, partly in section.

Referring to the drawing annexed, the numeral 44 designates a hopper mounted directly on the floor of the body adjacent to the rear end thereof and extending across the vehicle. Access to said hopper is obtained through a trap-door 45 forming part of the bottom of the box body when closed. The hopper 44 is preferably provided with an inclined bottom 45 and a slit-discharge-opening 46 through which the material will automatically flow when the valve-door 47 is opened. Pivotally connected to the bottom of the hopper is a closed box or chamber 47' which is tapered to a narrow discharge-mouth 48' that preferably lies beneath the slit-discharge-opening 46 of the hopper, and this closed box or chamber is connected by a pipe 48 and a flexible-tube coupling 49 with the discharge-opening of the muffler 15. The inclination of the blow-box can be varied by pulling or pushing on the rod 50, which preferably is controlled from the cab of the truck, the different adjustments serving to throw the material a greater or less distance from the hopper.

It will be understood that the nozzle-box 47' extends the length of the distributing hopper and that its contracted exit lies just under and approximately parallel with elongated discharge-opening 46 of the hopper. For the purpose of equalizing the pressure in the nozzle-chamber 47', I provide a baffle-wall 49' in the chamber which extends the full length of the exit and depends from the top wall of the nozzle to near the bottom wall thereof.

I may provide any means for pulling and pushing the rod 50; I prefer to do this by means of a pedal 51 mounted in a position convenient to the driver, and I may provide a suitable locking device such as a ratchet segment 52 for holding the pedal in its adjusted position. It will be observed that the exhaust gases of the engine issue from the nozzle 48' in the form of a long thin body extending the length of the hopper, just under the discharge-opening thereof, whereby the blast will strike the falling seed or fertilizer and scatter the same in a rearward direction. The baffle-plate 49' prevents the blast driving directly to the nozzle exit and insures distribution of the blast throughout the length of the hopper, so that the blast may issue from the exit at a substantially uniform pressure throughout the length thereof. This baffle also tends to break down the pulsations of the exhaust products and thereby tends to accumulate a pressure in the chamber 47' to thereby insure the blast as it issues from the exit being for all practical purposes continuous.

What I claim as new is:

1. In a motor vehicle for agricultural purposes, a hopper having a discharge-opening, and means for utilizing the power of the exhaust from the motor of the vehicle to distribute the material falling from the hopper, said means embodying an elongated blast nozzle arranged underneath the hopper and adapted to direct the blast into the material falling from the hopper, said blast nozzle having a baffle-plate extending longitudinally thereof and enclosed within it.

2. In a motor vehicle for agricultural purposes, a hopper having a discharge-opening, and means for utilizing the power of the exhaust from the motor of the vehicle to distribute the material falling from the hopper, said means embodying an elongated blast nozzle arranged underneath the hopper and pivoted thereto, so as to permit its exit edge to be raised and lowered, and means for actuating the blast nozzle.

In testimony whereof I hereunto affix my signature.

EDWARD R. BRIGGS.